United States Patent [19]
Fujitani

[11] Patent Number: 5,736,684
[45] Date of Patent: Apr. 7, 1998

[54] COMBINATIONAL WEIGHING OR COUNTING APPARATUS

[75] Inventor: Yugo Fujitani, Kurita-gun, Japan

[73] Assignee: Ishida Co., Ltd., Kyoto, Japan

[21] Appl. No.: 691,599

[22] Filed: Aug. 2, 1996

[30] Foreign Application Priority Data

Aug. 9, 1995 [JP] Japan .................................. 7-225815

[51] Int. Cl.⁶ .................................................. G01G 13/00
[52] U.S. Cl. ...................................... 177/25.18; 177/25.18
[58] Field of Search ............................................. 177/25.18

[56] References Cited

U.S. PATENT DOCUMENTS 4,609,058  9/1986  Sashiki et al. ................... 177/25.18
4,625,817  12/1986  Kawashima et al. ............. 177/25.18

*Primary Examiner*—Michael L. Gellner
*Assistant Examiner*—Randy W. Gibson

*Attorney, Agent, or Firm*—Loeb & Loeb LLP

[57] ABSTRACT

A combinational weighing or counting apparatus of a type in which the weighing hopper (30) once removed and subsequently remounted or the weighing hopper (30) from which the relatively large appendant has been separated naturally by gravity can be automatically reset to resume its participation in the combinational calculation. The apparatus includes an automatic resetting means (56) excludes, when the removal of the weighing hopper (30) is detected, weights detected by respective weight detecting means (1-1 to 1-N) corresponding to the removed weighing hopper (30) to allow the combinational weighing or counting to continue on the basis of weights of the articles M weighed by the remaining weighing hoppers (30). The automatic resetting means (56) also automatically reset, when the remounting of the weighing hopper (30) once removed is detected, the remounted weighing hopper (30) to resume its participation in the combinational weighing or counting based on the weight of the articles M weighed by such remounted weighing hopper (30).

6 Claims, 6 Drawing Sheets

COMBINATIONAL WEIGHING OR COUNTING APPARATUS

BACKGROUND OF THE INVENTION 1. (Field of the Invention)

The present invention relates generally to a combinational weighing or counting apparatus employing a plurality of weighing hoppers to perform a combinational calculation and, more particularly, to an automatic resetting of at least one of the weighing hopper which has been inhibited to participate in the combinational calculation.

2. (Description of the Prior Art)

As an apparatus for producing highly precisely and at a high speed bagged products each containing respective target weights or numbers of articles, such as, for example, snacks or pickles, of a kind having varying weights, a combinational weighing or counting apparatus is well known. In this known combinational weighing or counting apparatus, the articles to be weighed which have been accommodated in the plural weighing hoppers are weighed by respective weight detecting means such as, for example, load cells, and a combination of the weighing hoppers which would results in a combination of weights or numbers that fails within an acceptable range of total weight is selected so that only the articles accommodated within the selected weighing hoppers can be discharged and then collected to eventually provide the bagged products containing a desired weight or number of the articles.

In such case, the weight of the articles is measured by subtracting a known tare component of, for example, the weighing hopper and its associated support bracket from the gross weight measured by the load cell, that is, by adjusting the initial tare component to a zero-point (i.e., by performing an initial zero-point adjustment). However, it may occur that the weighing cycle dregs of the snacks or the pickles adhere to the weighing hopper or a drift occurs in the weighing apparatus as a result of change in temperature and/or time, to such an extent that the zero-point may be displaced, eventually resulting in an erroneous measurement of the weight. Accordingly, the zero-point adjustment is necessitated to perform at intervals of a predetermined number of weighing cycles, for example, once every ten weighing cycles to minimize the error in weight measurement.

The term "weighing cycle" referred to hereinabove and hereinbelow is intended to mean a process of vibrating feeders to supply the articles to be weighed into associated pool hoppers, supplying the articles to be weighed from the pool hoppers into the associated weighing hoppers so that the respective weighing hoppers can measure weights of the articles so supplied, selecting a combination of the weighing hoppers which would results in a combination of weights that fails within an acceptable range of total weight, and discharging the articles from the selected weighing hoppers to provide a target product while articles to be subsequently weighed are supplied into the weighing hoppers from the associated pool hoppers.

A zero-point adjusting circuit employed in the prior art combinational weighing apparatus for executing the initial zero-point adjustment discussed above is shown in FIG. 6, reference to which will now be made.

Analog weight signals outputted from a number N of weighing hoppers each equipped with a load cell 1 are supplied to a multiplexer 4 through respective amplifiers 2 and respective filters 3. When a timing signal is inputted from, for example, a bagging machine to a central processing unit (CPU) 15, the central processing unit 15 issues a switching signal by which the multiplexer 4 sequentially reads the analog weight signals W-1 to W-N which are subsequently inputted one at a time to a subtractor 5. On the other hand, where the zero-point adjustment is to be executed by setting the central processing unit 15 in an automatic zero-point adjusting mode, the central processing unit 15 reads from a memory 16 a zero-point correction value B for the first weighing hopper. This zero-point correction value B is supplied to a digital-to-analog (D/A) converter 10 to convert it into an analog output value which is subsequently inputted to the subtractor 5.

In the subtractor 5, subtraction is carried out to the empty weight value of the first weighing hopper and the correction value from the digital-to-analog converter 10 to provide a difference which is subsequently inputted to the central processing unit 15 through a sample hold circuit 6 and an analog-to-digital (A/D) converter 8 and also to a comparator 7. The central processing unit 15 decrease or increase the zero-point correction value B, which is to be outputted to the digital-to-analog converter 10 in dependence on an output value of the comparator 7 to thereby control to render the output value of the analog-to-digital converter 8 to become a predetermined value. This process is sequentially carried out for all of the weighing hoppers to thereby accomplish the initial zero-point adjustment prior to the apparatus being operated.

On the other hand, in the case of the zero-point adjustment to be carried out to compensate for displacement of the zero-point resulting from the drift occurring in the weighing device or adherence of dregs to the weighing hopper during the weighing operation, unlike that described hereinabove, without altering the zero-point correction value B outputted to the digital-to-analog converter 10, the current empty weight values of the weighing hoppers which have resulted in displacement of the zero-point are taken as a zero-point and are successively stored each time a predetermined number of the weighing cycles has been performed.

In the meantime, where the articles to be weighed are of a kind susceptible to result in adherence of dregs to the weighing hoppers, no weighing accuracy can be secured with the regular zero-point adjustment such as discussed above, requiring a regular cleaning of the weighing hoppers or a replacement of the weighing hoppers with similar weighing hoppers and, therefore, the necessity often occurs to remove the weighing hoppers for cleaning or replacement purpose. Also, it may occurs that a relatively large appendant is formed in one or some of the weighing hoppers and such relatively large appendant may often separate naturally from the weighing hoppers by gravity. In such cases, the weighing hoppers are automatically disabled from participating in the combination weighing in a manner which will now be discussed.

The input range of the analog-to-digital converter 8 employed in the zero-point adjusting circuit 18 is so set that in order to accomplish a highly accurate measurement of the weight (usually up to a few hundred grams) of the articles M to be weighed an initial tare component discussed above is subtracted by the subtractor 5 to zero value to permit the system to be able to measure the weight of the articles within a predetermined range, for example, 0 to 1 kg. Accordingly, the load cell corresponding to the weighing hopper removed for cleaning or replacement purpose tends to be in an under-scale condition in which the output signal becomes lower than the zero level, making the analog-to-digital converter 8 unable to perform the conversion and generate an abnormality signal AS. The central processing unit 15 does, in response to this abnormality signal AS, determine that the output signal or the detected weight signal is unsuitable for the combinational weight calculation and inhibits such weighing hopper from participating in the combinational weight calculation. Also, even where the analog-to-digital converter 8 is brought in the under-scale condition as a result of natural separation of a relatively large appendant of, say, about a few tens grams, the analog-to-digital converter 8 becomes unable to accomplish the conversion and, therefore, even in such case, the weighing hopper is inhibited from participating in the combinational weight calculation. In such case, after the weighing hopper has been remounted in the apparatus, an operator manually performs the initial zero-point adjustment subject to such weighing hopper so that the weighing hopper so adjusted can resume its participation in the combinational weight calculation at a predetermined timing.

With the prior art combinational weighing apparatus, however, it has been found that so far as the weighing hopper which has been inhibited from participating in the combinational weight calculation because of the cleaning or replacement is concerned, it cannot resume its participation in the combinational weight calculation unless the operator performs the manual initial zero-point adjustment and, therefore, the resetting procedure is very complicated and time-consuming.

Even where the weighing hopper in which the relatively large appendant is naturally separated, the weighing hopper cannot similarly resume its participation in the combinational weight calculation unless the operator performs the manual initial zero-point adjustment, accompanied by lowering of the efficiency with which the apparatus is operated.

SUMMARY OF THE INVENTION

The present invention is accordingly devised to substantially eliminate the above discussed problems inherent in the prior art combinational weighing or counting apparatus and is intended to provide an improved combinational weighing or counting apparatus of a type in which the weighing hopper once removed and subsequently remounted or the weighing hopper from which the relatively large appendant has been separated naturally by gravity can be automatically reset to resume its participation in the combinational calculation.

To this end, the combinational weighing or counting apparatus according to one aspect of the present invention includes a plurality of weighing hoppers, and a plurality of weight detecting means associated with the weighing hoppers, respectively, for detecting a weight of articles to be weighed which have been supplied into the respective weighing hopper, and operable to select a combination of a plurality of articles which falls within an acceptable range of total value with respect to a target value by combining respective weights or numbers of the articles. This combinational weighing or counting apparatus comprises a detecting means for detecting a remounting of at least one of the weighing hoppers which has once been removed; a zero-point adjusting means for updating stored information with a zero-point represented by the weight of the weighing hopper which has been remounted and is empty; and an automatic resetting means for allowing the weight of the articles supplied into the remounted weighing hopper to participate in weight calculation or number counting when the detecting means detects the remounting of the weighing hopper and after the weight of the remounted weighing hopper when empty has been zero-point adjusted by the zero-point adjusting means.

With this combinational weighing or counting apparatus, when the remounting of the weighing hopper once removed is detected, the weight of the articles to be weighed which have been supplied into the remounted weighing hopper can be automatically reset to assume its participation in the combinational weighing or counting after the zero-point adjustment.

Preferably, the detecting means is of a type operable to detect a removal of the weighing hopper discriminatingly from the remounting of the weighing hopper and, the automatic resetting means is of a type operable, in addition to the automatic resetting subsequent to the remounting of the weighing hopper, when the detecting means detects the removal of the weighing hopper, to exclude a detection signal from the weight detecting means, which is associated with the removed weighing hopper, while allowing the remaining weighing hoppers to continue combinational weighing or counting based on the weights of the articles measured by such remaining weighing hoppers.

According to this design, when the removal of the weighing hopper is detected, the combinational weighing or counting is carded out based on the weights of the articles weighed by the remaining weighing hoppers and, therefore, the combinational weighing or counting apparatus can be operated at a high efficiency.

It is to be noted that the detecting means may be of a type operable to detect the removal or remounting of the weighing hopper based on the weights measured by the weight detecting means. This is particularly advantageous in that no extra sensor for detecting the removal or remounting of the weighing hopper is needed, rendering the combinational weighing or counting apparatus as a whole to be simple in structure.

According to another aspect of the present invention, there is also provided a combinational weighing apparatus including a plurality of weighing hoppers, and a plurality, of weight detecting means associated with the weighing hoppers, respectively, for detecting a weight of articles to be weighed which have been supplied into the respective weighing hopper, and operable to select a combination of a plurality of articles which falls within an acceptable range of total value with respect to a target value by combining respective weights or numbers of the articles, in which apparatus there is provided a detecting means for detecting a condition in which appendant of the articles adhering to the weighing hopper is separated from such weighing hopper, in reference to a weight detected by the associated weight detecting means; a zero-point adjusting means for updating stored information with a zero-point represented by the weight of the weighing hopper which has been remounted and is empty; and an automatic resetting means for allowing the weight of the articles supplied into the weighing hopper, from which the appendant has been separated, to participate in weight calculation or number counting when the detecting means detects the appendant of the articles separating from the weighing hopper and after the weight of such weighing hopper has been zero-point adjusted by the zero-point adjusting means.

With this design, when the separation of the appendant from the weighing hopper is detected, the weight of the articles to be weighed which have been supplied into such weighing hopper can be automatically reset to assume its participation in the combinational weighing or counting after the zero-point adjustment.

In a preferred embodiment, the detecting means is so designed and so configured as to determine, when the weight detected by the weight detecting means decreases below a predetermined level (for example, zero level) by a quantity smaller than a predetermined quantity, that the appendant of the articles adhering to the weighing hopper is separated from the weighing hopper, but to determine, when the weight detected by the weight detecting means decreases below the pre-determined level by a predetermined quantity or greater, that the weighing hopper is removed. In such case, the automatic resetting means is preferably so designed and so configured as to operate, in addition to the automatic resetting subsequent to the remounting of the weighing hopper, when the detecting means detects the removal of the weighing hopper, to exclude the detection signal from the weight detecting means, which is associated with the removed weighing hopper, while allowing the remaining weighing hoppers to continue combinational weighing or counting based on the weights of the articles measured by such remaining weighing hoppers.

By this design, the combinational weighing or counting apparatus can be operated at a high efficiency since the combinational weighing or counting can continue even when the appendant of the articles to be weighed have been separated from the weighing hopper or the weighing hopper has been removed.

BRIEF DESCRIPTION OF THE DRAWING

In any event, the present invention will become more clearly understood from the following description of preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENT

Figure 1:
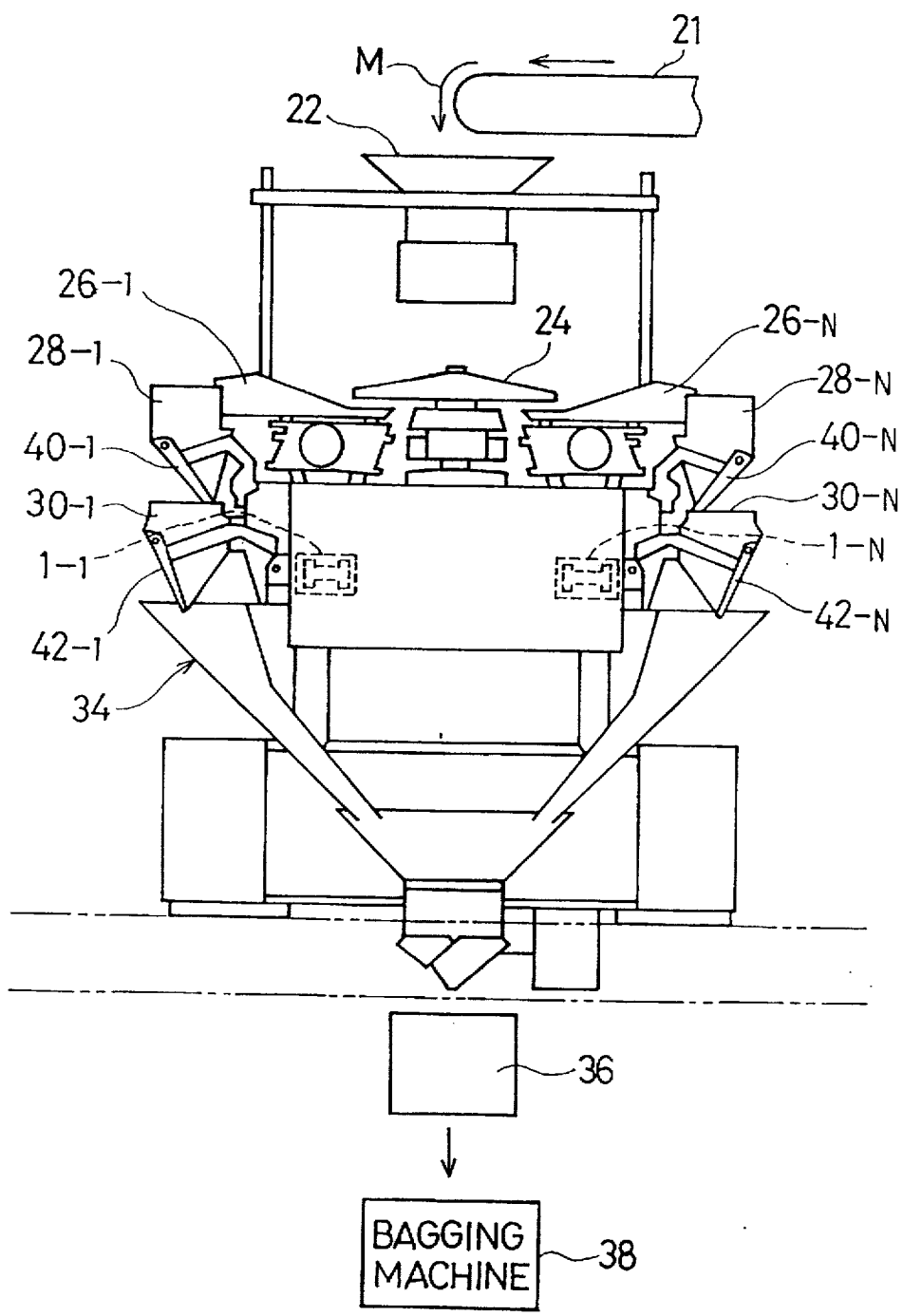
FIG. 1 is a schematic diagram showing a combinational weighing or counting apparatus according to a preferred embodiment of the present invention.

Referring first to FIG. 1, there is shown in a schematic side elevational representation a combinational weighing apparatus according to a preferred embodiment of the present invention. The combinational weighing apparatus shown therein comprises a supply conveyor 21 through which articles M to be weighed are supplied onto a supply chute 22. The articles M to be weighed supplied onto the supply chute 22 fall by gravity and are then collected at a central region of a vibratory dispensing feeder 24. The articles M to be weighed collected on the vibratory dispensing feeder 24 are, during vibration of the vibratory dispensing feeder 24, dispensed into a plurality of radial feeders 26 (26-1 to 26-N). The radial feeders 26 are also of a vibratory type and, accordingly, during vibration of those radial feeders 26, the article M to be weighed are supplied onto and temporarily pooled in a corresponding number of pool hoppers 28 (28-1 to 28-N) according to a counting scheme. When respective discharge gates 40 (40-1 to 40-N) of the pool hoppers 28 are subsequently opened, the articles M to be weighed within those pool hoppers 28 are discharged onto a corresponding number of weighing hoppers 30 (30-1 to 30-N). A weight detecting means 1 (1-1 to 1-N) such as, for example, a load cell, employed for each of the weighing hoppers 30, measures the weight of the article M to be weighed which have been supplied onto the respective weighing hopper 30 and subsequently outputs an analog detected weight signal indicative of the weight of the articles M in such respective weighing hopper 30. The respective weights of the articles M are then subjected to a combinational calculation as will be disclosed later, and the articles M in the weighing hoppers 30 are collected in a collecting chute 34, when respective discharge gates 42 (42-1 to 42-N) of the selected weighing hoppers 30 are opened, and are finally discharged onto a discharge chute 36. The articles M which have been so discharged onto the discharge chute 36 are filled by a bagging machine 38 into bags to provide bagged products each containing a target weight of the articles M.

Figure 2:
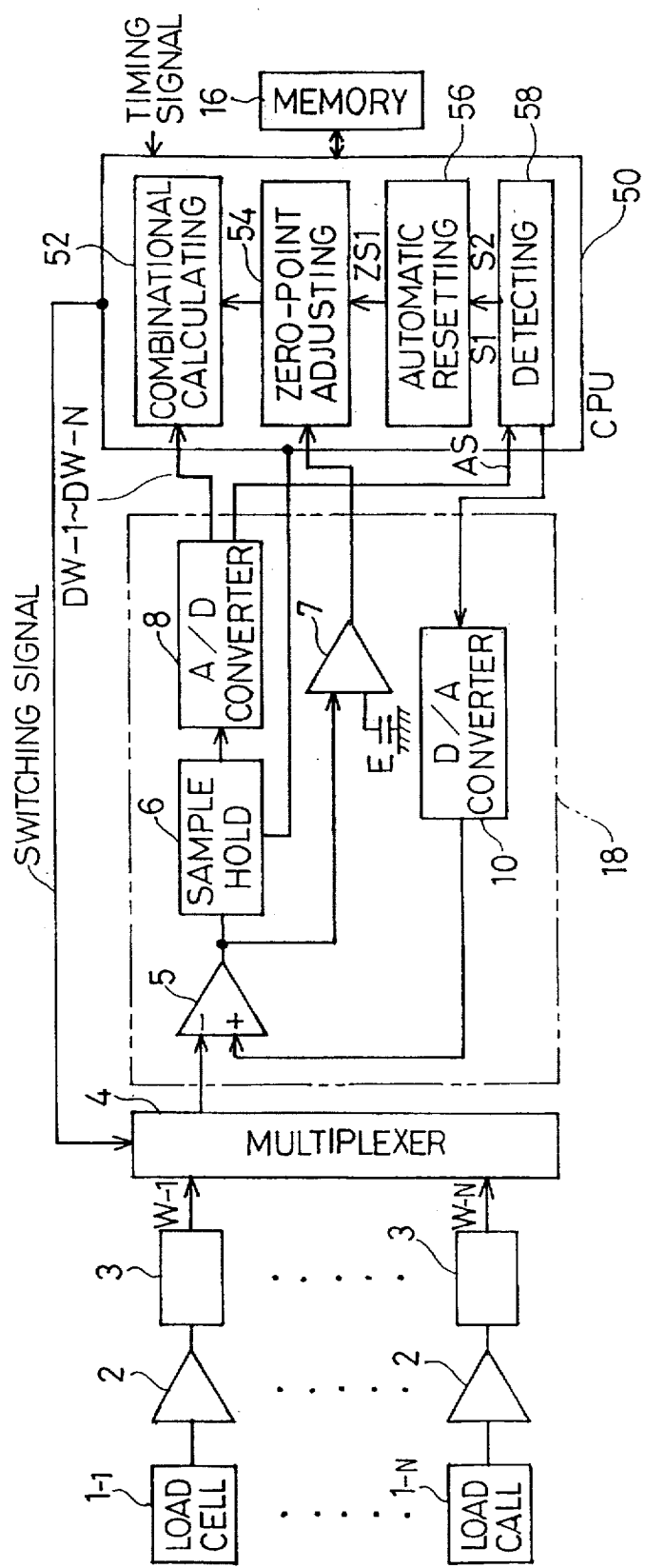
FIG 2 is a circuit block diagram showing an electric circuit employed in the combinational weighing or counting apparatus shown in FIG. 1.

A block circuit of a control unit employed in the combinational weighing apparatus of the kind discussed above is shown in FIG. 2. Each of the respective analog detected weight signals of the weighing hoppers 30 outputted from the associated load cells 1-1 to 1-N is amplified by an associated amplifier 2 and is subsequently filtered by an associated filter 3 to remove from the respective analog detected weight signal a mechanical vibration component added according to the weight of the articles M within such associated weighing hopper 30. Each filtered analog weight signals W-1 to W-N is then inputted to a multiplexer 4 which is operable in response to a switching signal supplied from a central processing unit (CPU) 50 to cause an analog-to-digital (A/D) converter 8 to selectively convert the filtered analog weight signals W-1 to W-N into corresponding digital weight signals DW-1 to DW-N. The digital weight signals DW-1 to DW-N are then supplied to the central processing unit 50.

The central processing unit 50 includes a combinational calculating means 52, a zero-point adjusting means 54, an automatic resetting means 56 and a detecting means 58. The combinational calculating means 52 is operable to select, based on the detected weights (represented by the digital weight signals DW-1 to DW-N) outputted from the analog-to-digital converter 8, a combination of the weighing hoppers 30 which would eventually result in a combination of the articles M of a total value or a total weight falling within an acceptable range of total weight relative to the target value or the target weight, and then to open the discharge gate 42 of the selected weighing hoppers 30 so that the combination of the articles M which measures an acceptable weight can be discharged from the associated weighing hoppers 30.

The detecting means 58 processes the detected weights (represented by the digital weight signals DW-1 to DW-N) given by the respective load cells 1 (1-1 to 1-N) to determine a difference between the value of the associated digital weight signal and a predetermined value in the event that such associated digital weight signal lowers the predetermined value and then to make reference to the difference to determine if appendant of the articles M to be weighed which have been stuck to the weighing hoppers 30 would have been naturally separated therefrom by gravity or if one or some of the weighing hoppers 30 would have been removed from the apparatus. The detecting means 58 also operates to detect the necessity of remounting of one or some of the weighing hoppers 30 once removed from the apparatus. The details of operation of the detecting means 58 will now be described.

An input range of the analog-to-digital converter included in a zero-point adjusting circuit 18 is so set in order to accomplish a highly accurate measurement of the weight of the articles M to be weighed that a range of weight, for example, 2 g to 1 kg of the articles M to be weighed can be measured by allowing a subtractor 5 to cancel the initial tare weight (about 2 to 3 kg). An analog-to-digital (A/D) converter 8 outputs an abnormality signal AS in the event of occurrence of an under-scale as a result of removal of one or some of the weighing hoppers 30 from the apparatus or as a result of natural separation of a relatively large appendant of, for example, about a few tens grams. The detecting means 58 operates in response to the abnormality signal AS to change by a predetermined quantity an output level of a digital-to-analog (D/A) converter 10 included in the zero-point adjusting circuit 18 for performing a zero-point adjustment, to thereby detect if one or some of the weighing hoppers 30 have been removed or if the appendant of the articles M have been naturally separated from one or some of the weighing hoppers 30. In other words, the output level of the digital-to-analog converter 10 is changed in, for example, a minus direction by a predetermined quantity corresponding to, for example, the weight to which it can detect the natural separation of the appendant, so that the detecting means 58 can detect the occurrence of the natural separation of the appendant, if during this period the analog-to-digital converter 8 is no longer in an under-scale condition, to thereby issue a separation signal S1, but the removal of one or some of the weighing hoppers 30, if during this period the analog-to-digital converter 8 remains in the under-scale condition, to thereby issue a removal signal S2.

Thereafter, when at least one weighing hopper 30 once removed for cleaning (rinsing and drying) purpose is remounted on the apparatus, the analog-to-digital converter 8 is relieved from the under-scale condition. Therefore, the detecting means 58 reads a zero-point correction value B associated with such one weighing hopper 30, which is stored in a memory 16, and set it in the digital-to-analog converter 10 so that it can detect whether or not the weighing hopper 30 has been remounted, in dependence on whether or not the output level of the analog-to-digital converter 8 is set to fall substantially within a predetermined range.

Figure 6:
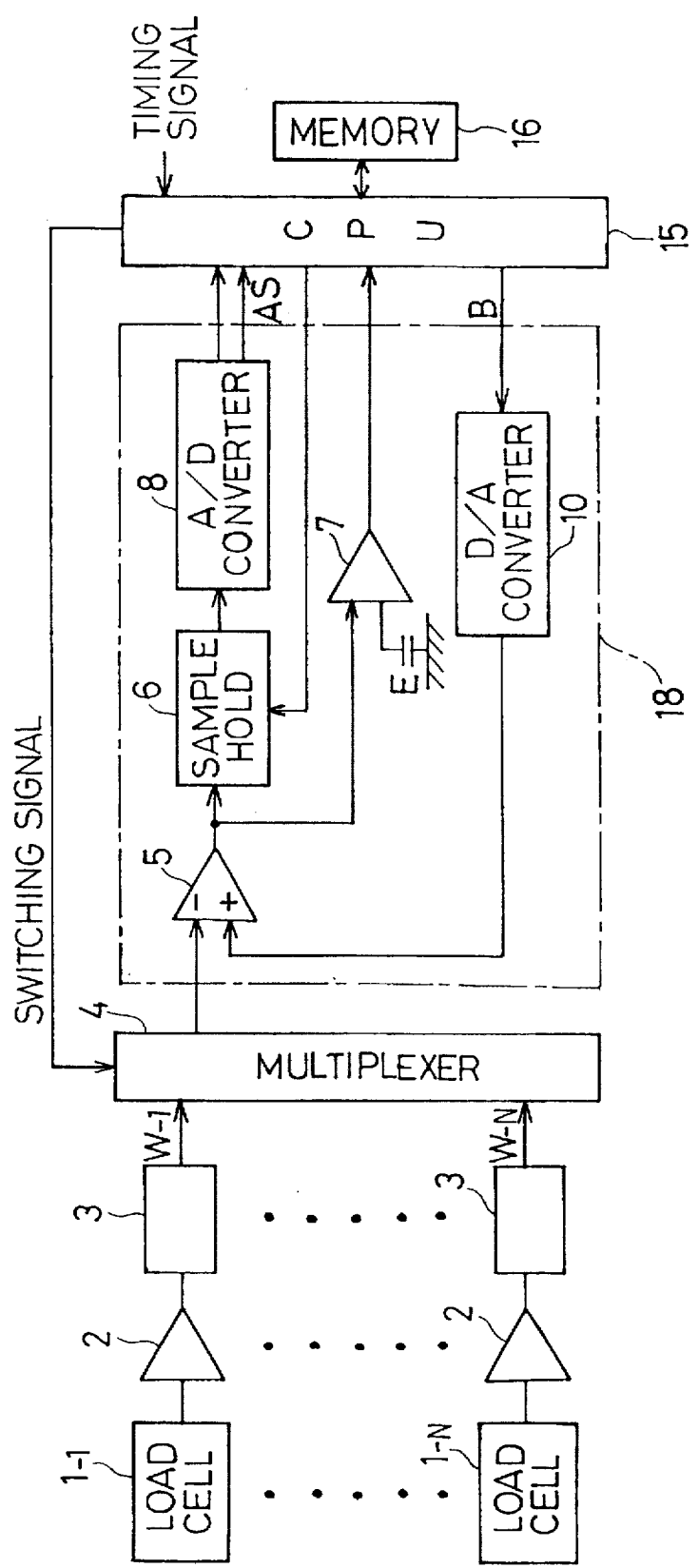
FIG. 6 is a circuit block diagram showing a zero-point adjusting device employed in the prior art combinational weighing apparatus.

The zero-point adjusting means 54 performs a zero-point adjustment by updating stored information with the weight of an empty weighing hopper 30, which has been remounted, taken as a zero-point. In order to avoid any possible weighing error resulting from departure from the zero-point which would be brought about by the appendant such as dregs of snacks or dregs of pickled products adhering to one or some of the weighing hopper 30 and/or resulting from departure from the zero-point which would be brought about by a drift occurring in the weighing device with change in temperature and/or time, the zero-point adjustment is regularly performed at intervals of a predetermined number of weighing cycles, for example, once every ten weighing cycles. In this way, based on the digital weight signals DW-1 to DW-N issued from the associated weighing hoppers 30 which have been subjected to the zero-point adjustment, a combinational calculation is performed by the combinational calculating means 52. It is to be noted that the zero-point adjusting circuit 18 operates in a manner similar to that employed in the prior art combinational weighing apparatus shown in FIG. 6 and, therefore, the details thereof are not herein reiterated for the sake of brevity.

The combinational weighing apparatus now under discussion in accordance with the present invention makes use of the automatic resetting means 56 for resetting to the combinational weighing at least one of the weighing hoppers 30 which is unsuitable for participation in combinational calculation. This automatic resetting means 56 causes the zero-point adjusting means 54 to execute the zero-point adjustment in response to a zero-point adjustment command ZS1 when the remounting of the weighing hopper 30 is detected by the detecting means 58 or to similarly execute the zero-point adjustment even when the relatively large appendant of the articles M to be weighed are naturally separated from the weighing hopper 30, thereby allowing the weighing hopper 30 to automatically resume a combinational calculating operation.

In other words, when the remounting of the weighing hopper 30 has been detected by the detecting means 58 and the zero-point associated therewith has subsequently been adjusted, articles M to be weighed are supplied to such weighing hopper 30 and the combinational weighing is resumed during the subsequent weighing cycle. As regards the weighing hopper 30 in which the natural separation of the appendant has been detected, articles M to be weighed are supplied onto such weighing hopper 30 after the memory has been updated with the zero-point represented by the weight value of the weighing hopper 30 then given, and the combinational weighing is resumed during the subsequent weighing cycle.

The sequence of operation of the combinational weighing apparatus will now be described in detail with particular reference to the flowchart shown in FIG. 3.

At the outset, a decision step S1 is carried out to determine if a timing signal is outputted from the bagging machine 38. Should the decision step S1 indicate that the timing signal has been outputted from the bagging machine 38, weight data are inputted from the respective weighing hoppers 30 at the subsequent step S2. In the event that the weight date inputted from each weighing hopper 30 is lower than a predetermined value, for example, zero, indicating the under-scale condition (during which no weight measurement is possible), an abnormality flag is set in a status register of the associated weighing hopper 30 at step S3.

Then, so far as the weighing hopper 30 for which the abnormality flag has been set is concerned, the detecting means 58 lowers the output level of the digital-to-analog converter 10 of the zero-point adjusting circuit 18 by the predetermined quantity so that whether or not the weighing hopper 30 is removed or whether or not the appendant of the articles M to be weighed adhering to the weighing hopper 30 are separated naturally can be detected at step S4. The input data given by the weighing hopper 30 for which the abnormality flag has been set is inhibited from participating in the subsequent cycle of combinational weighing.

Figure 3:
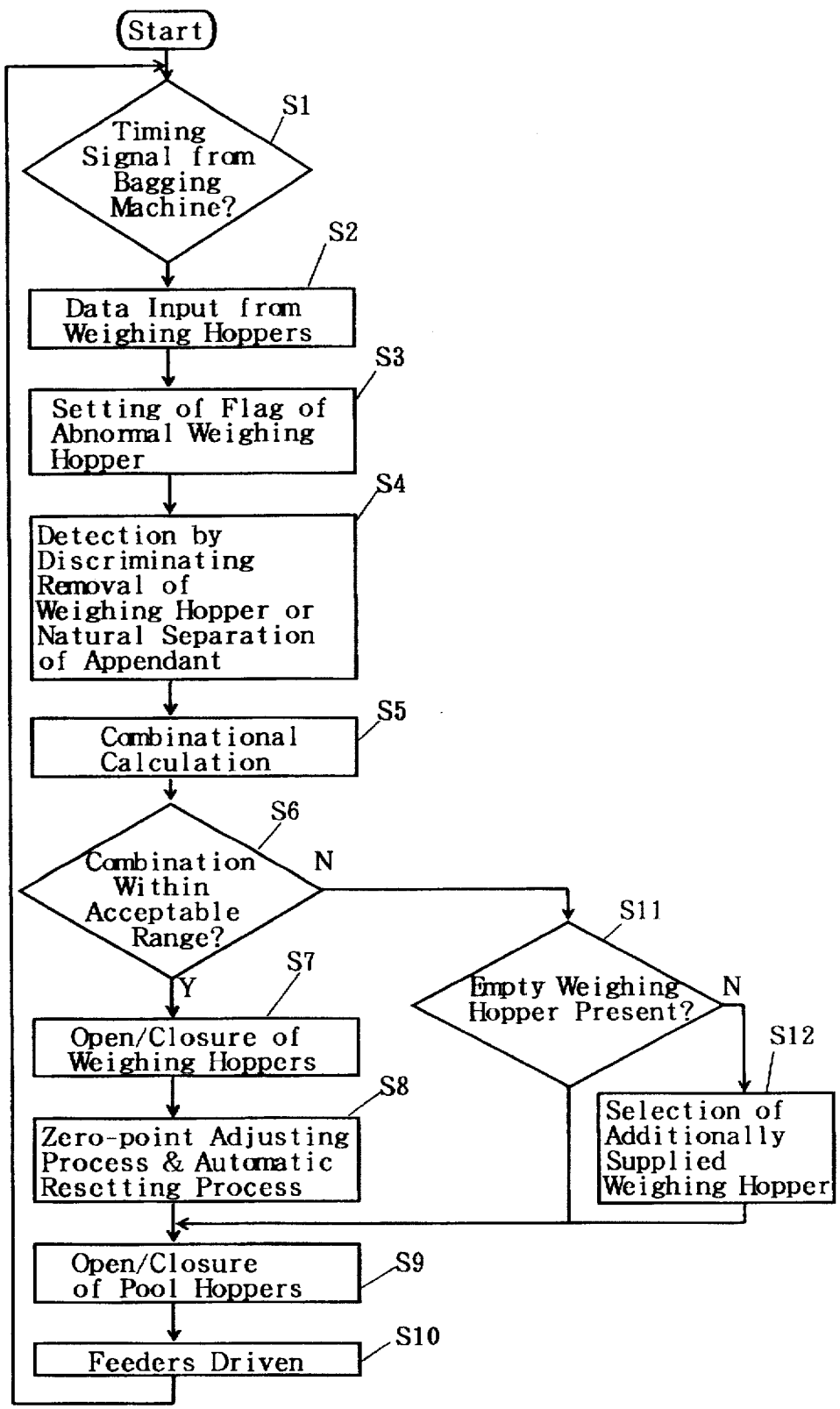
FIG. 3 is a flowchart showing the sequence of operation of the combinational weighing or counting apparatus shown in FIG. 1.
Figure 4:
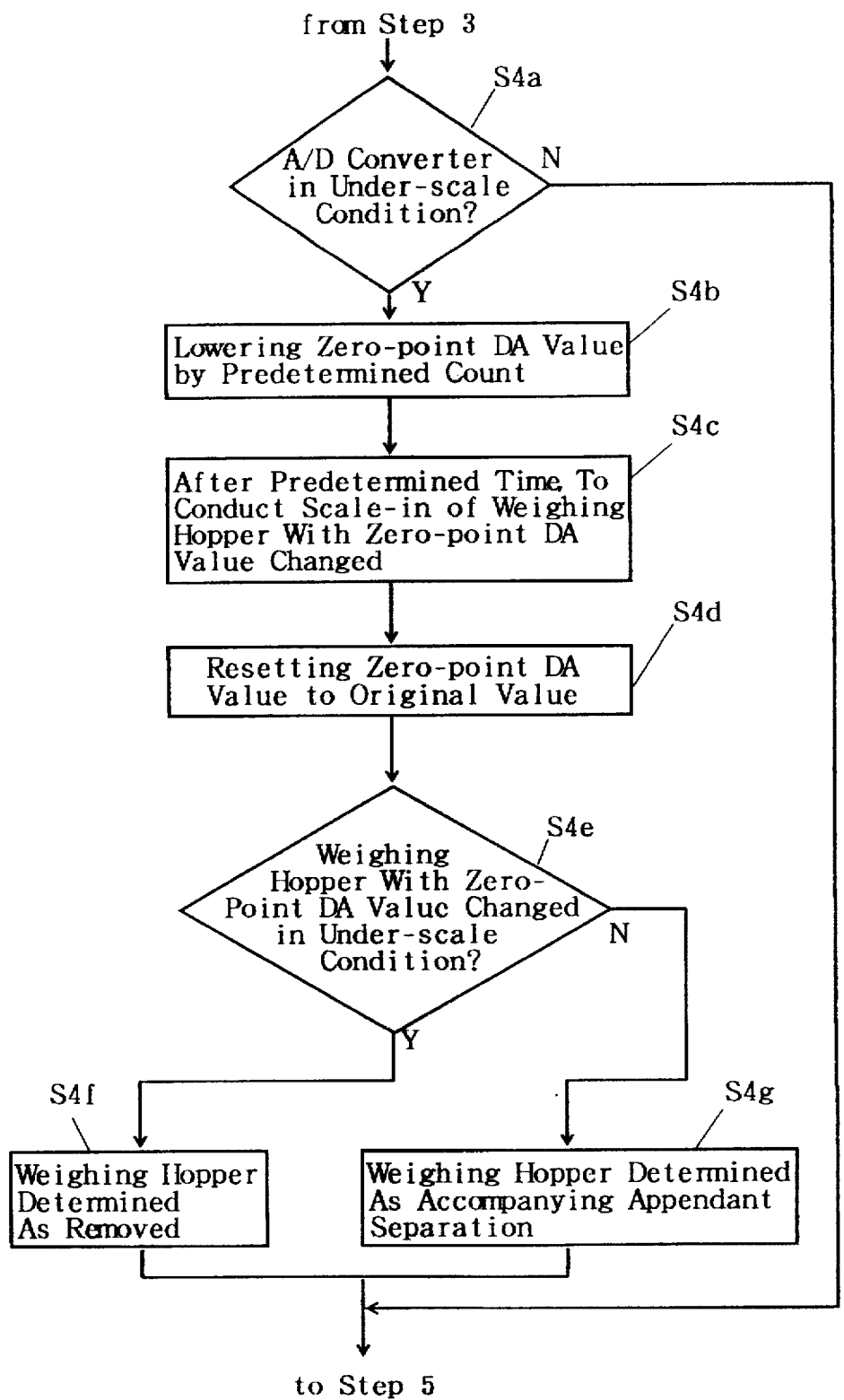
FIG. 4 is a flowchart showing the sequence of operation of a detecting means employed in the combinational weighing or counting apparatus shown in FIG. 1.

The sequence of operation of the detecting means 58 to determine if the weighing hopper 30 has been removed or if the appendant of the article M have been naturally separated from the weighing hopper 30 is shown in the flowchart of FIG. 4, reference to which will now be made. With a scale-in during operation, a decision is made at step S4a to determine if the analog-to-digital converter 8 is in the under-scale condition or receiving minus level input signals. Should the decision step S4a indicate the under-scale condition occurring in the digital-to-analog converter 8, a zero-point DA value of the digital-to-analog converter 10 is lowered by a predetermined count corresponding to the previously mentioned predetermined quantity at step S4b. Then, after a predetermined time, the relevant weighing hopper 30 is specified and the weight data given by such specified weighing hopper 30 is inputted at step S4c. The program flow subsequently goes to step S4d at which a modified zero-point DA value is reset to the original value to prepare for a possible re-entry into the combinational calculation, followed by determination of whether or not the inputted weight data (step S4c) is descriptive of an under-scale weight at step S4e. Should the decision step S4e indicate that the inputted weight data is still indicative of the under-scale weight, it is deemed at step S4f that the weighing hopper 30 has been removed, but should the decision step S4e indicate that the inputted weight data is not indicative of the under-scale weight, it is deemed at step S4g that the relatively large appendant of the articles M has been naturally separated from the weighing hopper 30. The program flow subsequent to step S4f or S4g continues to step S5 in the flowchart of FIG. 3.

Whether or not the weighing hopper 30 once removed from the apparatus is remounted is determined by whether or not the weight data inputted at step S2 is, when compared with the initial value relevant to the empty weighing hopper 30 stored in the memory 16, of an output level substantially equal to the initial value. The weighing hopper 30 deemed as remounted is subjected to the zero-point adjustment at step S8 and the abnormality flag is reset before it is automatically resumed. In other words, by a process at step S9, articles M to be weighed are loaded into the empty weighing hopper 30, the weight of which is inputted at step S2 during the subsequent cycle of combinational weighing to thereby accomplish an automatic participation in the combinational calculation.

Referring back to FIG. 3, the combinational calculation is carried out at step S5 and, during this combinational calculation, the weighing hopper 30 which has given rise to an abnormal weight is excluded. By this combinational calculation at step S5, it is ascertained at step S6 if there is a combination of weights failing within the acceptable range of total weight with respect to the target value.

Should the decision at step S6 indicate that there is the combination of the weights falling within the acceptable range of total weight with respect to the target value, the discharge gate 42 of the relevant weighing hopper 30 is opened to discharge the articles M to be weighed at step S7. Once the articles M to be weighed have been so discharged, the discharge gate 42 of the relevant weighing hopper 30 is closed and, simultaneously therewith, the discharge gate 40 of the associated pool hopper 28 is opened to allow the articles M to be subsequently weighed to be supplied onto the weighing hopper 30 at step S9. After a predetermined time the discharge gate 40 of the associated pool hopper 28 is closed and the radial feeders 26 are driven at step S10 to effect the supply of the articles M to be weighed onto the pool hoppers 28, with the program flow subsequently returning to step S1.

On the other hand, should the decision at step S6 indicate that there is no combination of the weights falling within the acceptable range of total weight with respect to the target value, the program flow goes to another decision step S11 to determine if there is an empty weighing hopper 30. Should the decision at step S11 indicate the presence of the empty weighing hopper 30, the program flow goes to step S9, but should decision at step S11 indicate the absence of the empty weighing hopper 30, the weighing hopper 30 to be additionally supplied with articles is selected at step S12 before the program flow goes to step S9.

Figure 5:
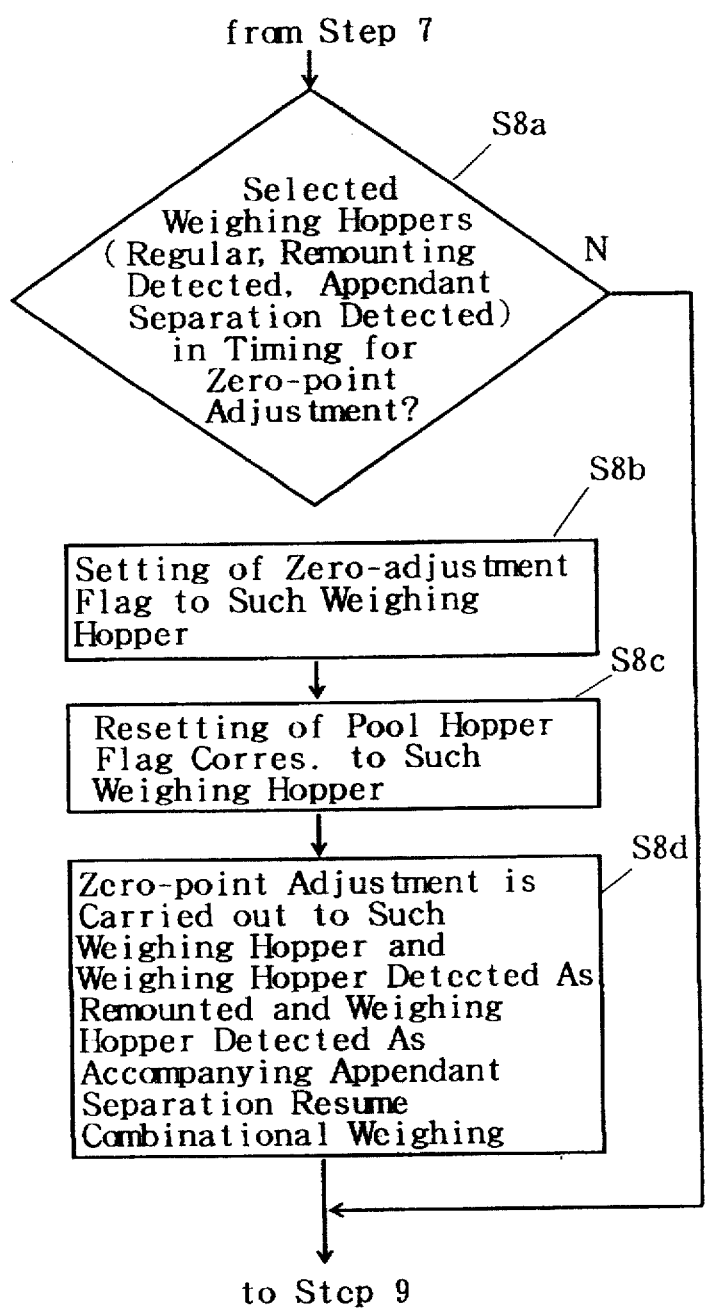
FIG 5 is a flowchart showing a zero-point adjusting process and an automatic resetting process both executed in the combinational weighing or counting apparatus shown in FIG. 1.

Both of the zero-point adjustment process and the automatic resetting process executed at step S8 of the flowchart shown in FIG. 3 are shown in the flowchart of FIG. 5. Referring to FIG. 5, a decision is first made at step S8a to determine if timing has come to the selected weighing hopper 30 to effect the zero-point adjustment. Other than this weighing hopper 30, the weighing hopper once removed for cleaning purpose and subsequently remounted and/or the weighing hopper 30 from which the relatively large appendant of the articles M to be weighed has been naturally separated therefrom are subject to the zero-point adjustment as well.

Unless the weighing hopper 30 subject to the zero-point adjustment is available, no zero-point adjustment is carried out and the program flow goes immediately to step S9 of the flowchart of FIG. 3. On the other hand, the decision at step S8a indicate that of the selected weighing hoppers 30 the weighing hopper 30 subject to the zero-point adjustment is found, a zero-adjustment flag is set in such weighing hopper 30 at step S8b. Then, an Open/Close flag of the pool hopper 28 associated with such weighing hopper 30 is reset, followed by inhibition of the opening of the discharge gate 40 of such associated pool hopper 28 at step S8c. In this way, no articles M to be weighed are supplied to the weighing hopper 30 in which the zero-adjustment flag has been set and, therefore, information stored is updated at step S8d with the zero-point represented by the weight of the empty weighing hopper detected during the subsequent weighing cycle. In contrast thereto, in the case of the weighing hopper 30 remounted and the weighing hopper from which the appendant of the articles M to be weighed are separated naturally, the information stored is updated with the weight of such weighing hopper 30 taken as the zero-point since such weighing hopper 30 is empty at that time.

So long as the weighing hopper 30 detected as remounted or the weighing hopper 30 detected with the appendant separated naturally therefrom is concerned, various flags by which such weighing hopper 30 has been inhibited from participating in the combinational calculation are reset by the automatic resetting means 56 at step S8d after the above described zero-point adjustment so that articles M to be weighed can be supplied onto such weighing hopper 30 at step S9 in the flowchart of FIG. 3, thereby allowing such weighing hopper 30 to participate in the combinational calculation during the subsequent weighing cycle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in the foregoing embodiment, the combinational calculating means 52 selects a combination of the weighing hoppers 30 which would eventually result in the acceptable range with respect to the target value, hoppers other than the weighing hoppers or booster hoppers for temporarily storing the articles which has been weighed may be disposed below the associated weighing hoppers so that the booster hoppers can be selected for the combination. Although in the foregoing embodiment of the present invention the use is made of the digital-to-analog converter 10 and the subtractor 5 to adjust the input level of the analog-to-digital converter 8, the both may not be always necessary and may be dispensed with. In such case, arrangement may be made that the weight data should be inputted directly to the analog-to-digital converter 8 and the removal and remounting of the weighing hopper 30 and the natural separation of the appendant of the articles M from the weighing hopper 30 can be detected from the input value. The employment of this alternative arrangement is particularly advantageous in that the number of component parts of the electric circuit of the combinational weighing apparatus can be minimized.

Also, although the detecting means has been shown and described as operable to detect the removal or remounting of the weighing hopper 30 in reference to the weight detected by the weight detecting means, a different detecting means such as, for example, a contact-type switch that can be switched on in contact with the weighing hopper when the latter is mounted may be employed to detect the removal and subsequent mounting of the weighing hopper 30.

Moreover, although in the foregoing illustrated embodiment a combinational calculation of the weights of the articles M to be weighed accommodated within the respective weighing hoppers 30 has been made, the concept of the present invention can be equally applied to a combinational counting apparatus of a kind wherein the weights of the weighing hoppers 30 are divided by a single weight of the articles M to be weighed and are then converted into the number, and then a combination of a plurality of articles which falls on the target total number or within an acceptable range of total number is selected.

Accordingly, such changes and modifications are, unless they depart from the scope of the present invention as delivered from the claims annexed hereto, to be construed as included therein.

What is claimed is:

1. A combinational weighing or counting apparatus including a plurality of weighing hoppers, and a plurality of weight detecting means associated with the weighing hoppers, respectively, for detecting a weight of articles to be weighed which have been supplied into the respective weighing hopper, and operable to select a combination of a plurality of articles which falls within an acceptable range of total value with respect to a target value by combining respective weights or numbers of the articles, said apparatus comprising:

a detecting means for detecting a remounting of at least one of the weighing hoppers which has once been removed;

a zero-point adjusting means for updating stored information with a zero-point represented by the weight of the weighing hopper which has been remounted and is empty; and an automatic resetting means for allowing the weight of the articles supplied into the remounted weighing hopper to participate in weight calculation or number counting when the detecting means detects the remounting of the weighing hopper and after the weight of the remounted weighing hopper when empty has been zero-point adjusted by the zero-point adjusting means.

2. The combinational weighing or counting apparatus as claimed in claim 1, wherein said detecting means is operable to detect the remounting of the weighing hopper in reference to a weight detected by the weight detecting means.

3. The combinational weighing or counting apparatus as claimed in claim 1, wherein said detecting means is operable to detect a removal of the weighing hopper discriminatingly from the remounting of the weighing hopper; and wherein said automatic resetting means is operable, when detecting means detects the removal of the weighing hopper, to exclude a detection signal from the weight detecting means, which is associated with the removed weighing hopper, while allowing the remaining weighing hoppers to continue combinational calculation or counting based on the weights of the articles measured by such remaining weighing hoppers.

4. The combinational weighing or counting apparatus as claimed in claim 3, wherein said detecting means is operable to detect by discriminating the first and second conditions based on the weights of the articles measured by the weight detecting means.

5. A combinational weighing or counting apparatus including a plurality of weighing hoppers, and a plurality of weight detecting means associated with the weighing hoppers, respectively, for detecting a weight of articles to be weighed which have been supplied into the respective weighing hopper, and operable to select a combination of a plurality of articles which falls within an acceptable range of total weight with respect to a target value by combining respective weights or numbers of the articles, said apparatus comprising:

a detecting means for detecting a condition in which appendant of the articles adhering to the weighing hopper is separated from such weighing hopper, in reference to a weight detected by the associated weight detecting means;

a zero-point adjusting means for updating stored information with a zero-point represented by the weight of the weighing hopper which has been remounted and is empty; and an automatic resetting means for allowing the weight of the articles supplied into the weighing hopper, from which the appendant has been separated, to participate in weight calculation or number counting when the detecting means detects the appendant of the articles separating from the weighing hopper and after the weight of such weighing hopper has been zero-point adjusted by the zero-point adjusting means.

6. The combinational weighing or counting apparatus as claimed in claim 5, wherein said detecting means is operable to determine, when the weight detected by the weight detecting means decreases below a predetermined level by a quantity smaller than a predetermined quantity or smaller, that the appendant of the articles adhering to the weighing hopper is separated from the weighing hopper, but to determine, when the weight detected by the weight detecting means decreases below the predetermined level by a predetermined quantity or greater, that the weighing hopper is removed; and wherein said automatic resetting means is operable, when the detecting means detects the removal of the weighing hopper, to exclude the detection signal from the weight detecting means, which is associated with the removed weighing hopper, while allowing the remaining weighing hoppers to continue combinational calculation or counting based on the weights of the articles measured by such remaining weighing hoppers.

* * * * *